United States Patent [19]

Yamaguchi et al.

[11] 4,262,309
[45] Apr. 14, 1981

[54] FACSIMILE RECEPTION APPARATUS

[75] Inventors: Shingo Yamaguchi; Eiichi Adachi, both of Tokyo, Japan

[73] Assignee: Ricoh Company, Ltd., Tokyo, Japan

[21] Appl. No.: 42,055

[22] Filed: May 24, 1979

[30] Foreign Application Priority Data

May 25, 1978 [JP] Japan .................................. 53-61689

[51] Int. Cl.³ .............................................. H04N 7/12
[52] U.S. Cl. .................................. 358/260; 358/264; 370/102
[58] Field of Search ................ 370/102; 375/112, 116; 358/133, 134, 135, 136, 260, 264, 280; 179/15.55 T

[56] References Cited

U.S. PATENT DOCUMENTS

| | | | |
|---|---|---|---|
| 3,504,287 | 3/1970 | Deregnaucourt | 370/102 |
| 3,622,695 | 11/1971 | Rugaber | 358/260 |
| 4,051,537 | 9/1977 | Kondoh | 358/264 |
| 4,054,914 | 10/1977 | Fukuoka | 358/256 |
| 4,090,222 | 5/1978 | Nakagome et al. | 358/280 |

FOREIGN PATENT DOCUMENTS

1247971 9/1971 United Kingdom .............. 179/15.55 T

Primary Examiner—Joseph A. Orsino, Jr.
Attorney, Agent, or Firm—David G. Alexander

[57] ABSTRACT

An expander (13) expands lines of compressed received data. Each line of compressed data includes data bits followed by fill bits. A sync code follows each compressed line. A memory (14), (16) stores a previous line of expanded data and a current line of expanded data. In response to detection of the sync code corresponding to the previous line of data, the current line of data is stored in the memory while the previous line of data is fed out to a printer (53), (56). Detection of the sync code is inhibited while the previous line of data is being fed out, the feeding out of the previous line of data occuring during the same period of time the current line is being stored. In this manner, fill bits which were converted into a sync code by a transmission error or the like are prevented from being erroneously detected as a true sync code.

10 Claims, 9 Drawing Figures

FACSIMILE RECEPTION APPARATUS

BACKGROUND OF THE INVENTION

The present invention relates to an improved facsimile reception apparatus for receiving and processing transmitted data in compressed form.

Facsimile transmission systems are extremely useful for transmitting original documents in numerous commercial and bureaucratic applications. The original document is scanned to produce electrical signals which are transmitted over a telephone line or the like to a remote receiver. The receiver prints a facsimile or reproduction of the original document in response to the received signals. In order to increase the transmission speed, it is desirable to compress the signals for transmission using run length encoding or the like.

The original document is scanned in an orthogonal pattern of scan lines and the signals transmitted on a line by line basis. Each line of compressed data consists of data bits and fill bits. A sync code is added at the end of each line. In order to minimize the buffer memory requirements of the receiver, each line of data has a predetermined length and the printer at the receiver is constructed to print each line faster than it is compressed and transmitted. Thus, each line of compressed data has a predetermined number of bits. Often, the run length code is quite short, and fill bits, generally consisting of zeroes, are added to the data bits to increase the length of the line to the predetermined value. Printing of a new line is effected in response to detection of a sync code.

A problem has existed heretofore in this type of facsimile system regarding erroneous detection of fill bits as sync codes. This is because where the fill bits consist of zeroes and the sync code consists of several zeroes and ones to the end of the fill bits, transmission noise or errors caused by other phenomenon can alter the fill bits such that they constitute a false sync code.

A false sync code can cause the printer to increment to the next line before finishing printing a current line. Since the data between the false sync code and the true sync code will be printed as a line of data, a line of erroneous data will be printed and the total number of lines on the reproduction will be excessive. This results in considerable distortion. The printer may also malfunction mechanically in response to a false sync code.

One prior art expedient for overcoming this problem is to count the number of bits of data between successive sync codes after expansion of the intervening line. Another expedient is to utilize a timer to measure the length of time between successive sync codes. However, these methods are not practical because of excessive complexity and cost.

SUMMARY OF THE INVENTION

A facsimile reception apparatus embodying the present invention includes an expander for expanding compressed data in the form of lines, each line of compressed data including data bits followed by fill bits, a sync code following each line of compressed data, and buffer memory means for storing a current line of expanded data and a previous line of expanded data. Sync detector means detect the sync code. Control means control the memory means to simultaneously begin feed out the previous line of expanded data and storing the current line of expanded data upon detection of the sync code of a previous line of compressed data by the detector means. Inhibit means inhibit the detector means while the memory means is feeding out the previous line of expanded data.

In accordance with the present invention, an expander expands lines of compressed received data. Each line of compressed data includes data bits followed by fill bits. A sync code follows each compressed line. A memory stores a previous line of expanded data and a current line of expanded data. In response to detection of the sync code corresponding to the previous line of data, the current line of data is stored in the memory while the previous line of data is fed out to a printer. Detection of the sync code is inhibited while the previous line of data is being fed out, the feeding out of the previous line of data occuring during the same period of time the current line is being stored. In this manner, fill bits which were converted into a sync code by a transmission error are prevented from being erroneously detected as a true sync code.

It is an object of the present invention to provide an improved facsimile reception apparatus comprising means which prevent false sync codes from affecting the operation of the apparatus.

It is another object of the present invention to provide a facsimile reception apparatus which operates in a more reliable and efficient manner than comparable apparatus known heretofore.

It is another object of the present invention to provide a facsimile reception apparatus which can be manufactured in an advantageous manner and at low cost on a commercial production basis.

It is another object of the present invention to provide a generally improved facsimile reception apparatus.

Other objects, together with the foregoing, are attained in the embodiments described in the following description and illustrated in the accompanying drawing.

DESCRIPTION OF THE PREFERRED EMBODIMENTS

While the facsimile reception apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
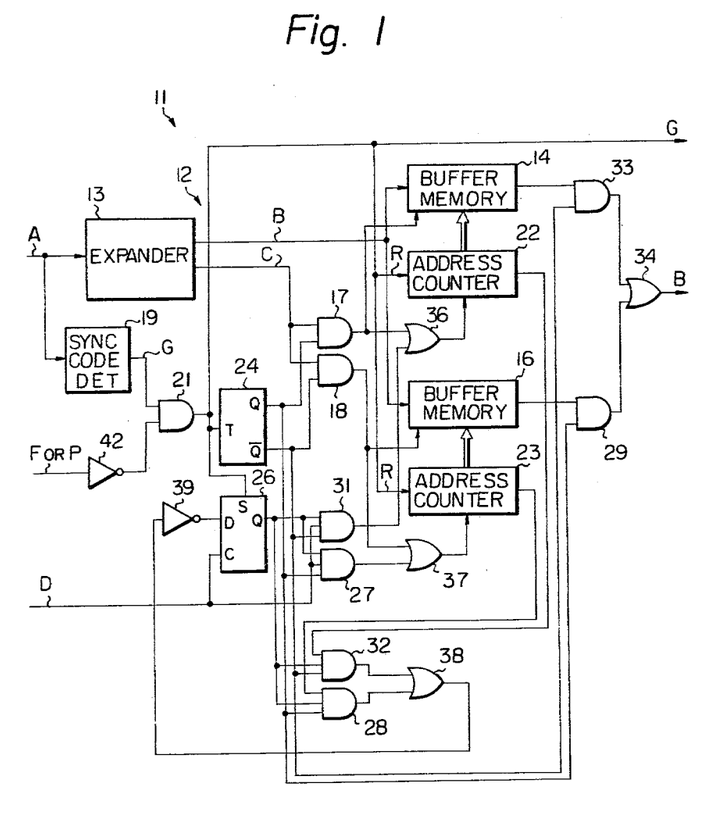
FIG. 1 is a schematic diagram of an expander and buffer memory of a facsimile reception apparatus embodying the present invention.

Referring now to FIG. 1 of the drawing, an expander and buffer unit 12 of a facsimile reception apparatus 11 is illustrated in schematic form. The unit 12 comprises an expander 13 for expanding lines of received data. Compressed data A is fed to the input of the expander 13 from a modem (not shown) which demodulates the data as transmitted from a remote transmitter. The data A is organized in the form of scan lines. Each line of data represents a scan line on an original document which was scanned by the transmitter. Typically, the original data, in which a dark area on the document is represented by a logical one and a light area on the document is represented by a logical zero, is compressed prior to transmission to the apparatus 11. Where run length compression is employed, each scan line A as applied to the expander 13 will consist of a plurality of data bits constituting a run length code and a plurality of fill bits following the data bits. A sync code consisting of a plurality of logical zero or one bits in a predetermined sequence is added to the end of each line. The expander 13 expands the data A to reconstruct the original data bits from the run length code and feeds the expanded data B to inputs of buffer memories 14 and 16 in a serial manner. The expander 13 also produces input clock pulses C which are applied to inputs of AND gates 17 and 18. The outputs of the AND gates 17 and 18 are connected to clock inputs of the memories 14 and 16 respectively.

Figure 2:
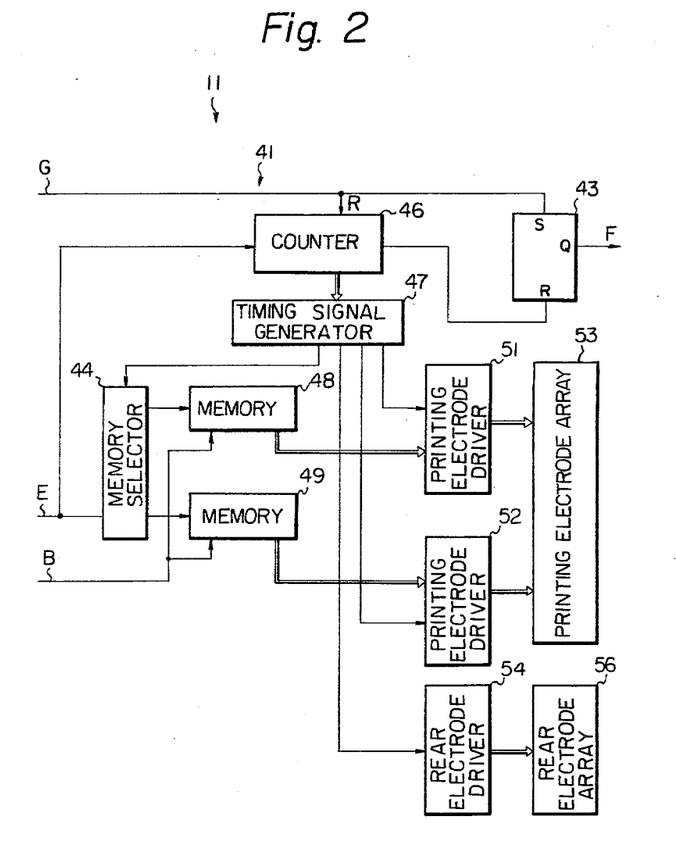
FIG. 2 is a schematic diagram of a printing unit of the present apparatus.

The data A which contains the sync code is also applied to a sync code detector 19 which produces a sync signal G upon detection of the sync code. The output of the sync code detector 19 is connected to an input of an AND gate 21, the output of which is connected to reset inputs of address counters 22 and 23 which function to select the addresses in the memories 14 and 16 respectively. The output of the AND gate 21 is also connected to a toggle input of a buffer selector flip-flop 24 and a set input of an output enable flip-flop 26. The Q and $\bar{Q}$ outputs of the flip-flop 24 are connected to inputs of the AND gates 17 and 18 respectively. The $\bar{Q}$ output of the flip-flop 24 is also connected to inputs of AND gates 27, 28 and 29. The Q output of the flip-flop 24 is also connected to inputs of AND gates 31, 32 and 33. The outputs of the memories 14 and 16 are connected to inputs of the AND gates 33 and 29 respectively, the outputs of which are connected to inputs of an OR gate 34.

The outputs of the AND gates 17 and 31 are connected to inputs of an OR gate 36, the output of which is connected to a count input of the address counter 22. Outputs of the AND gates 18 and 27 are connected to inputs of an OR gate 37, the output of which is connected to a count input of the address counter 23.

The Q output of the flip-flop 26 is connected to inputs of the AND gates 31, 27, 32 and 28. Output clock pulses D are applied to the clock input of the flip-flop 26 and also to inputs of the AND gates 31 and 27. A carry output of the address counter 22 is connected to an input of the AND gate 32. A carry output of the address counter 23 is connected to an input of the AND gate 28. Outputs of the AND gates 32 and 28 are connected to inputs of an OR gate 38, the output of which is connected through an inverter 39 to the D input of the flip-flop 26. The sync signal G is fed to a printing unit 41 which is shown in FIG. 2. An inhibit signal F is fed from the unit 41 through an inverter 42 to an input of the AND gate 21.

Referring now to FIG. 2, the sync signal G is applied to a set input of a flip-flop 43. The inhibit signal F is constituted by the Q output of the flip-flop 43.

Output clock pulses E which, in this embodiment, may be constituted by the clock pulses D, are fed to inputs of a memory selector 44 and a counter 46. The output of the counter 46 is connected to a timing signal generator 47 which generates timing signals to control the operation of the memory selector 44. The memory selector 44 gates the clock pulses E to either of memories 48 and 49 which may be constituted by serial-in, parallel-out shift registers. The expanded data signals B are fed from the OR gate 34 to inputs of the memories 48 and 49. Parallel outputs of the memories 48 and 49 are connected to inputs of printing electrode drivers 51 and 52 respectively. The drivers 51 and 52 are selectively enabled by the timing signal generator 47. A carry output of the counter 46 is connected to a reset input of the flip-flop 43. The outputs of the drivers 51 and 52 are connected to inputs of a printing electrode array 53 which is constructed to induce an electrostatic charge pattern on a sheet of paper in accordance with the electrodes of the array 53 which are energized. The timing signal generator 47 is also constructed to energize a rear electrode driver 54 which energizes a rear electrode array 56 which cooperates with the array 53 in forming an electrostatic charge pattern.

Prior to the reception of the first line of data, the counters 22, 23 and 46 are reset to zero by means not shown. The flip-flop 24 may be in either state. It will be assumed that the Q output of the flip-flop 24 is high and the $\bar{Q}$ output thereof is low. The flip-flop 26 is reset so that the Q output is zero. The low Q output of the flip-flop 26 inhibits the AND gates 31, 27, 32 and 28 and prevents data from being read or fed out of the memories 14 and 16.

The high Q output of the flip-flop 24 enables the AND gate 17. The AND gate 18 is inhibited by the low $\bar{Q}$ output of the flip-flop 24. The expander 13 receives the signals A from the modem and expands the data to produce the data signals B in which a logically high bit represents a dark area on the original document and vice-versa. The data signals B are fed from the expander 13 to the memories 14 and 16 in synchronism with the clock pulses C. However, the clock pulses C are only gated to the memory 14 by the AND gate 17 and are prevented from reaching the memory 16. Thus, the memory 14 is enabled for inputting the first line of data signals B. The clock pulses C gated through the AND gate 17 bifunction as input enable pulses for the memory 14 and count pulses for the address counter 22.

The counter 22 has a capacity equal to the number of bits in each line of expanded data and selects the address for inputting data signals in the memory 14. The data signals are sequentially stored in successively higher numbered storage locations in the memory 14. Thus, the first line of expanded data is stored in the memory 14.

The detector 19 detects the sync code which is added to the end of the compressed data and produces the sync signal G in response thereto. The signal G is gated through the AND gate 21 and toggles the flip-flop 24. The sync signal G also resets the counters 22 and 23 to zero and is fed to the printing unit 41 as will be described in detail below. The sync signal G also sets the flip-flop 26.

The flip-flop 24 after being toggled produces a high $\overline{Q}$ output and a low Q output. The high $\overline{Q}$ output enables the AND gates 18, 31, 32 and 33. The low Q output inhibits the AND gates 17, 27, 28 and 29. This serves the function of changing the memory 14 from input operation to output operation and changing the memory 16 from output operation (it was not used during storage of the first line in the memory 14) to input operation.

More specifically, the clock pulses C are gated through the AND gate 18 to the memory 16 and counter 23 for inputting or storing the second line in the memory 16. The output clock pulses D are gated through the AND gate 31 and OR gate 36 to the counter 22 for incrementing the counter 22 and memory 14 to output the first line of data. The high $\overline{Q}$ output of the flip-flop 24 also enables the AND gate 33 so that the data in the memory 14 may be gated through the AND gate 33 to the printing unit 41.

The second line of expanded data is stored in the memory 16 in the same manner described above for the first line. Simultaneously, the first line is fed out of the memory 14 to the printing unit 41. After the last data bit has been fed out of the memory 14, the address counter 22 produces a carry signal which is gated through the AND gate 32, OR gate 38 and inverter 39 to the D input of the flip-flop 26.

As mentioned above, the flip-flop 26 was set by the sync signal G and the high Q output thereof is applied to the AND gates 31, 27, 32 and 28. However, only the AND gates 31 and 32 are enabled since the low $\overline{Q}$ output of the flip-flop 24 inhibits the AND gates 27 and 28. The output clock pulses D are gated to the counter 22 through the AND gate 31 and OR gate 36. The carry signal from the counter 22 is fed back to the flip-flop 26 through the AND gate 32, OR gate 38 and inverter 39. The high carry signal is inverted by the inverter 39 so that the flip-flop 26 is reset (the Q output goes low) in response to the next clock pulse D. Thus, the AND gates 31, 27, 32, 28, 33 and 29 are inhibited and the output or reading operation is terminated.

The sync code following the second line of compressed data toggles the flip-flop 24 to change the memory 14 to the input mode to store the third line of expanded data. The memory 16 is changed to the output mode to feed out the second line of expanded data. The flip-flop 26 is set to enable the output operation. The operation continues until all lines of received data have been processed. It will be seen that the memories 14 and 16 are alternatingly used for input and output. Each line of compressed data consisting of data bits and fill bits has a predetermined total number of bits. Similarly, each line of expanded data has a predetermined number of bits which is larger than the number of bits of the compressed data. The ratio of these two numbers determines the compression ratio of the system.

The date signals B fed out of the unit 12 are applied to the memories 48 and 49 of the unit 41. Each memory 48 and 49 has the capacity of storing one-half line of expanded data. The counter 46 has a capacity equal to one line of expanded data. The counter 46 is reset by the sync signal G and counts up in response to the clock pulses E which in the illustrated embodiment may be constituted by the clock pulses D.

The timing signal generator 47 decodes the count in the counter 46 and controls the selector 44 to cause the memory 48 to operate in the input mode for the first half of the line of data and in the output mode for the second half of the line of data. The operation of the memory 49 is opposite to that of the memory 48.

For the first line of expanded data, the first half of the line is stored in the memory 48. Then, the second half of the line is stored in the memory 49. While the second half of the line is being stored, the first half of the line is being applied in parallel through the driver 51 to the printing electrode array 53 under the control of the timing signal generator 47. Each data bit is applied to a separate electrode of the array 53, although not illustrated in detail. A logically high bit causes an electrostatic charge to be applied from the corresponding electrode to a sheet of copy paper and induce an electrostatic charge point thereon. A dark toner is applied to the paper which adheres to the electrostatic charge points and is later fixed to the paper to provide a permanent facsimile reproduction. No charge is applied in areas corresponding to logically low bits. In this manner, dark image points are produced in accordance with logically high data signals and vice-versa.

After the first half of the first line is fed to the driver 51 for printing and the second half of the first line is stored in the memory 49, the functions of the memories 48 and 49 are changed over. The memory 48 is used to input the first half of the second line and the memory 49 is used to output the second half of the first line for printing. It will be noted that the printing operation for the second half of each previous line occurs during the storage of the first half of each current line. The timing signal generator 47 controls the driver 54 to energize the rear electrodes 56 in an appropriate manner in combination with the array 53 to produce a high quality facsimile reproduction.

In accordance with the embodiments of FIGS. 1 and 2, the time required for storing the current line of expanded data is substantially equal to the length of time required for feeding out the previous line of expanded data to the unit 41. Thus, the counter 46 produces a carry signal just before the sync code is received by the detector 19.

The sync code G of the previous line of compressed data sets the flip-flop 43. The high Q output of the flip-flop 43, or the inhibit signal F, is inverted by the inverter 42 and inhibits the AND gate 21. This prevents any sync code produced by a transmission error in the fill bits from being gated through the AND gate 21 as a false sync signal. The flip-flop 43 is reset by the carry signal from the counter 46 so that the inhibit signal F goes low just before the true sync code is received by the detector 19. Thus, the AND gate 21 is enabled at this time so that the true sync code is gated therethrough.

Figure 3:
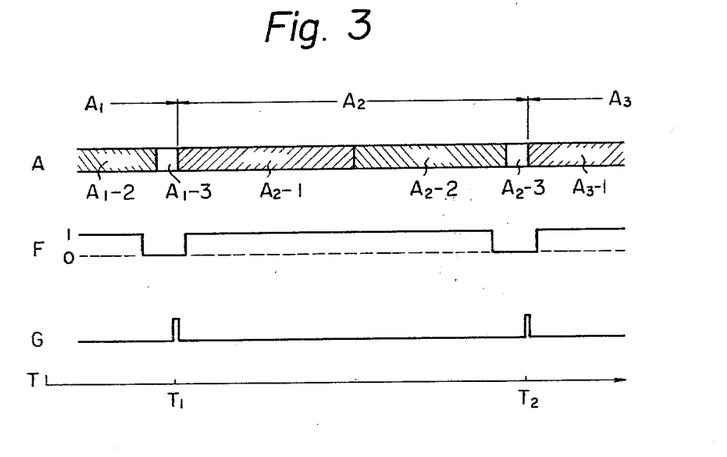
FIG. 3 is a diagram illustrating normal operation of the present apparatus.
Figure 4:
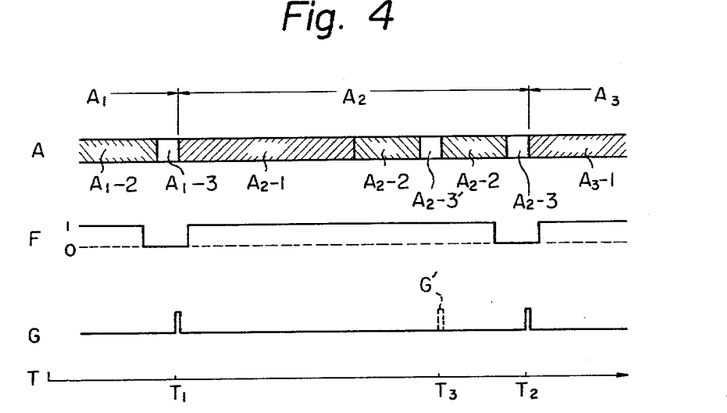
FIG. 4 is a diagram illustrating the operation of the present apparatus in response to a false sync code.

This operation is illustrated in FIGS. 3 and 4. A first block of data signals A is designated as A1 and comprises data bits A1-1 (not shown), fill bits A1-2 and a sync code A1-3. A second block of data signals A is designated as A2 and comprises data bits A2-1, fill bits A2-2 and a sync code A2-3. A third block of data signals A is designated as A3 and comprises data bits A3-1, fill bits A3-2 and a sync code A3-3 (not shown). The second line of compressed data signals, for example, is included in the block A2 and consists of only the data bits A2-1 and fill bits A2-2. The sync code A2-3 is not considered as part of the line of compressed data but is added at the end of the line.

The normal operation of the apparatus 11 is illustrated in FIG. 3. The sync signal G corresponding to the previous block A1 is produced at a time T1, causing the inhibit signal F to go high. The counter 46 overflows prior to a time T2 at which the next sync code G is produced corresponding to the current block A2. The inhibit signal F goes low prior to reception of the first bit of the sync code A2-3, thereby enabling the second sync code A2-3 to be detected by the detector 19.

An abnormal operation is illustrated in FIG. 4. In this, a false sync code A2-3' is produced within the fill bits A2-2 due to a transmission or compression error, noise signals or the like. The detector 19 produces a false sync signal G' at a time T3 in response to the false sync code A2-3'. However, the inhibit signal F is high at the time the false sync signal G' is produced, thereby inhibiting the AND gate 21. In this manner, the false sync signal G' is not gated through the AND gate 21 and is effectively ignored. Thus, there will be no printing malfunction and the data signals will be reproduced in the proper manner. It will thus be seen that, in accordance with the present invention, a true sync code is detected and processed whereas false sync codes produced by erroneous alteration of fill bits are ignored. This means that the present apparatus 11 operates in a normal manner under circumstances in which a prior art apparatus would malfunction.

The apparatus 11 is designed in such a manner that the time required for printing is substantially the same as for receiving and expanding the compressed data. If the printing speed were shorter than the expansion speed, the inhibit pulse would go low too soon, and a false sync pulse which was received after the inhibit pulse went low would cause a malfunction.

It is further desirable to design the apparatus 11 in such a manner as to be able to receive signals from remote transmitters which operate at different transmission speeds or rates. To accommodate this function, the apparatus 11 may be adapted in such a manner that the time required to print one line of data is substantially equal to or less than the time for transmission of one line of data at the highest transmission rate of any facsimile system with which the apparatus 11 is required to communicate. This may be accomplished by providing an auxiliary buffer memory between the units 12 and 41. Such an auxiliary buffer memory is designated as 61 and illustrated in FIG. 5.

Figure 5:
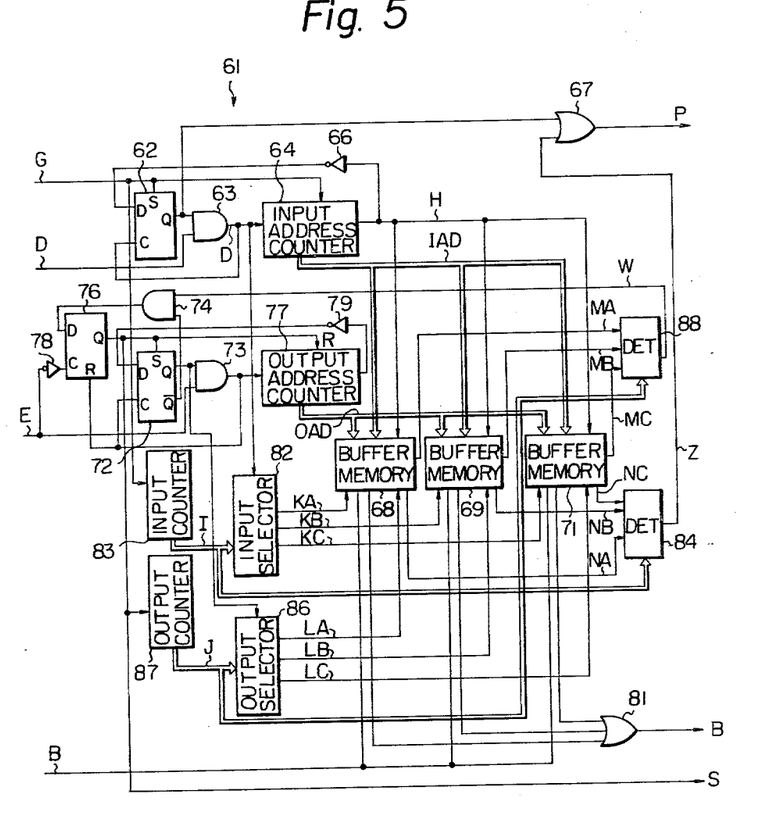
FIG. 5 is a schematic diagram of an auxiliary buffer memory of the present apparatus.

The memory 61 comprises an input status flip-flop 62 having a set input connected to receive the sync signal G and a Q output connected to an input of an AND gate 63. The output of the AND gate 63 is connected to a clock input of the flip-flop 62 and also to a count input of an input address counter 64. A carry output of the counter 64 is connected through an inverter 66 to a D input of the flip-flop 62. The sync signal G is also applied to a reset input of the counter 64. The clock pulses D are applied to an input of the AND gate 63. The Q output of the AND gate 62 is also connected to an input of an OR gate 67, the output of which constitutes a buffer busy signal P.

The output of the counter 64 is designated as IAD and constitutes an input address for buffer memories 68, 69 and 71. The carry output of the counter 64 is designated as H and is also fed to the memories 68, 69 and 71.

The memory 61 further comprises an output status flip-flop 72 having a Q output connected to an input of an AND gate 73 and a $\overline{Q}$ output connected to an input of an AND gate 74. The output of the AND gate 74 is connected to a D input of an output start pulse generator flip-flop 76. The Q output of the flip-flop 76 constitutes an output start pulse S and is applied to a set input of the flip-flop 72 and also to the printing unit 41 to cause line feed although not shown in detail.

The output of the AND gate 73 is connected to a count input of an output address counter 77, a clock input of the flip-flop 72 and a reset input of the flip-flop 76. The clock pulses E are applied through an inverter 78 to a clock input of the flip-flop 76 and to an input of the AND gate 73. The signal S is fed to a rest input of the counter 77. A carry output of the counter 77 is fed through an inverter 79 to a D input of the flip-flop 72.

The output of the counter 77 constitutes an output address OAD and is connected to the memories 68, 69 and 71. The outputs of the memories 68, 69 and 71 are connected to inputs of an OR gate 81, the output of which is connected to the printing unit 41. The data signals B are applied from the unit 12 to inputs of the memories 68, 69 and 71.

The output of the AND gate 63 is connected to an input selector 82 which has outputs KA, KB and KC connected to the memories 68, 69 and 71 respectively. The sync signal G is applied to a modulo-3 input counter 83 which has an output connected to the input selector 82 and designated as I. The signal I is also fed to an input of a detector 84 which receives inputs NA, NB and NC from the memories 68, 69 and 71 respectively. The output of the detector 84 is designated as Z and is connected to an input of the OR gate 67.

The Q output of the flip-flop 72 is connected to an output selector 86 which has outputs connected to inputs of the memories 68, 69 and 71 and designated as LA, LB and LC respectively. The signal S is applied to a modulo-3 output counter 87 which has an output designated as J connected to the output selector 86. The signal J is also applied to a detector 88 which also receives inputs MA, MB and MC from the memories 68, 69 and 71 respectively. The output of the detector 88 is designated as W and fed to an input of the AND gate 74.

Figure 6:
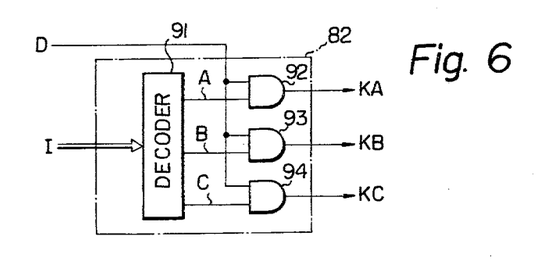
FIG. 6 is a schematic diagram of a decoder of the auxiliary buffer memory.

The input selector 82 is illustrated in FIG. 6. The output selector 86 has an essentially similar construction and is not illustrated. The selector 82 comprises a decoder 91 for decoding the count I in the counter 83. The decoder 91 has outputs A, B and C which are applied to inputs of AND gates 92, 93 and 94 which produce the signals KA, KB and KC respectively at their outputs. The clock pulses D are applied to other inputs of the AND gates 92, 93 and 94 from the output of the AND gate 63 as will be described in detail below. The decoder 82 functions in such a manner as to produce logically high outputs A, B and C in response to counts of 0, 1 and 2 respectively in the counter 83.

Figure 7:
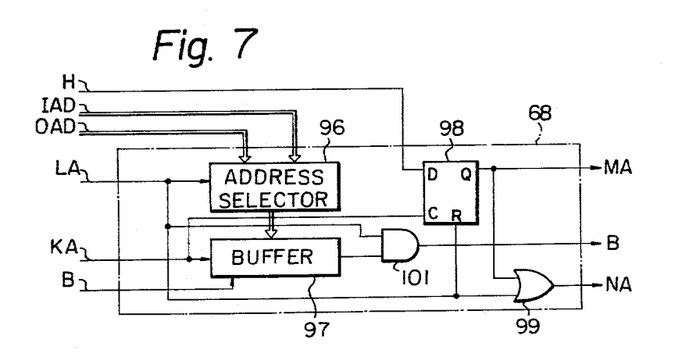
FIG. 7 is a schematic diagram of an individual memory of the auxiliary buffer memory.

The memories 68, 69 and 71 are identical, with the memory 68 being shown in FIG. 7. The memory 68 comprises an address selector 96 which receives the addresses IAD and OAD from the counters 64 and 77 respectively and selects one of the address IAD and OAD in accordance with the state of the signal LA from the selector 86. When the signal LA is logically low, it indicates an input operation and the address selector 96 selects the input address IAD from the counter 64. When the signal LA is logically high, it indicates an output operation and the selector 96 selects the output address OAD from the counter 77. The selected address IAD or OAD is applied from the selector 96 to a buffer memory element 97 to address the corresponding memory location therein.

The signal B is applied to an input of the buffer 97 from the unit 12. The signal KA from the selector 82 is applied to a write enable input of the buffer 97 and is constituted by the clock pulses D. The signal KA is also applied to a clock input of a flip-flop 98. The carry signal H is applied to a D input of the flip-flop 96. The Q output of the flip-flop 98 constitutes the signal MA and is applied to the detector 88 and an input of an OR gate 99. The signal LA is applied to a reset input of the flip-flop 98 and another input of the OR gate 99, the output of the OR gate 99 constituting the signal NA.

The signal LA is applied to an input of an AND gate 101, the output of which is connected to the unit 41. The output of the buffer 97 is connected to another input of the AND gate 101.

Figure 8:
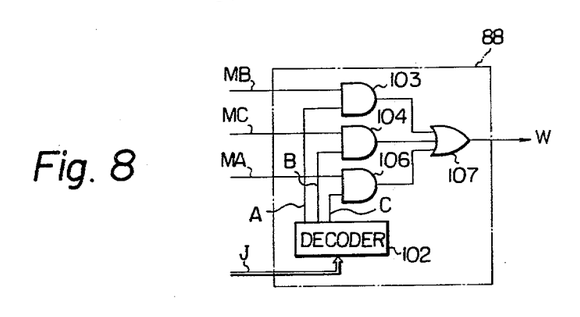
FIG. 8 is a schematic diagram of memory sensor of the auxiliary buffer memory.

The detectors 84 and 88 are identical, with the detector 88 being shown in FIG. 8. The detector 88 comprises a decoder 102 which decodes the count J in the counter 87. The decoder 102 produces high outputs A, B and C in response to counts of 0, 1 and 2 respectively in the counter 87. The outputs A, B and C are connected to inputs of AND gates 103, 104 and 106 respectively, the outputs of which are connected to inputs of an OR gate 107. The signal W appears at the output of the OR gate 107. The signals MB, MC and MA are applied to other inputs of the AND gates 103, 104 and 106 respectively.

The clock pulses D are used for inputting data into the memory 61. The clock pulses E are used for outputting data from the memory 61. The input and output operations are independent of each other and may occur at different rates. The frequency of the clock pulses E is equal to or higher than the frequency of the clock pulses D. At the highest transmission speed, the frequencies of the clock pulses D and E are substantially equal. Where the transmission speed is lower than the maximum reception speed of the apparatus 11, the frequency of the clock pulses D is lower than the frequency of the clock pulses E by a ratio corresponding to the difference between the transmission speeds. The frequency of the clock pulses E is selected to be high enough that one line of date may be printed in a length of time required to receive and expand one line of data at the highest transmission speed. The frequency of the clock pulses E is fixed. Thus, transfer of data from the memory 61 to the printing unit 41 and printing of the line of data by the printing unit 41 is always performed at maximum speed regardless of the speed at which data is received, expanded and stored in the memory 61.

A sync signal G resets the input address counter 64 to zero, sets the flip-flop 62 and increments the input counter 83. It will be assumed that prior to any reception operation the count in the counters 83 and 87 is maximum (two). Thus, in response to the first sync signal G the counter 83 will be incremented to zero. The flip-flop 72 is reset and none of the memories 68, 69 and 71 is selected for output operation as will be understood from further description.

The high output of the flip-flop 62 enables the AND gate 63 so that the clock pulses D are gated therethrough to the input address counter 64 and selector 82. Since the count I is zero, the decoder 91 produces a high output A which enables the AND gate 92. Thus, the clock pulses D are gated through the AND gates 63 and 92 to the memory 68 as the signal KA which constitutes an input enable signal. The clock pulses D cause the counter 64 to increment and sequentially select higher numbered addresses in the memory 68 to store the first line of expanded data therein.

As shown in FIG. 7, the input enable signal KA is applied to the buffer 97. The signal LA is low so that the address selector 96 selects the input address IAD and causes the buffer 97 to function in the input mode. The low signal LA inhibits the AND gate 101 to prevent output of data from the buffer 97. The counter 64 produces a carry output H after the first line has been stored in the memory 68. The carry signal H is inverted by the inverter 66 and applied to the D input of the flip-flop 62. Since the output of the AND gate 63 is connected to the clock input of the flip-flop 62, the next clock pulse D will be gated through the AND gate 63 to the clock input of the flip-flop 62 and cause the flip-flop 62 to be reset. The Q output of the flip-flop 62 will go low inhibiting the AND gate 63 and preventing further clock pulses D from reaching the counter 64 and selector 82. The result is termination of the input operation of the first line.

In response to the next sync pulse G the input operation is performed in the manner described above. However, the counter 83 is incremented to the count of one so that the memory 69 is selected for input. Thus, the next line is stored in the memory 69. Successive lines of data are stored in the memories 68, 69 and 71 in an alternating manner. For example, the third line of data will be stored in the memory 71, the fourth line in the memory 68, etc. The frequency of the clock pulses D is preferably variable and selected to correspond to the transmission speed of the received data.

The first line of data is output from the buffer 68 after storage is completed as indicated by the carry pulse H. Referring to FIG. 8, the output J of the counter 86 is two and the decoder 102 produces a high output C. This enables the AND gate 106 which will produce a high signal when the signal MA goes high, said signal being gated through the OR gate 107 as the signal W.

The carry signal H sets the flip-flop 98 in response to the corresponding clock pulse D (KA) so that the Q output of the flip-flop 98, constituting the signal MA, goes high. The signal MA is gated through the AND gate 106 and OR gate 107 to the AND gate 74. Since the Q output of the flip-flop 72 is high, the signal W is applied through the AND gate 74 to the D input of the flip-flop 76. The flip-flop 76 is set by the trailing edge of the next clock pulse E inverted by the inverter 78.

The high Q output of the flip-flop 76 sets the flip-flop 72, resets the output address counter 77 to zero, increments the output counter 87 and causes line feed in the printing unit 41. The high Q output of the flip-flop 72 is applied to the output selector 86. Since the output counter 87 is incremented to zero, the high Q output of the flip-flop 72 is gated through the output selector 86 as the signal LA. The signal LA is applied to the memory 68 to select the same for output operation. The high signal LA controls the address selector 96 to select the output address OAD and enables the AND gate 101 so that data may be fed from the buffer 97 to the printing unit 41. The signal LA also resets the flip-flop 98 so that the signal MA goes low. It will be noted that during the input operation of the first line the high Q output of the flip-flop 98 was gated through the OR gate 99 as a high signal NA. Although the signal LA resets the flip-flop 98, the high signal LA is gated through the OR gate 99 to maintain the signal NA high. The reason for this operation will be described in detail below.

The next clock pulse E resets the flip-flop 76. However, the flip-flop 72 remains set and produces a high Q output. The flip-flop 76 is reset by a clock pulse E gated through the AND gate 73. The high Q output of the flip-flop 72 maintains the AND gate 73 enabled so that clock pulses E are gated therethrough to the output address counter 77 which sequentially selects higher numbered memory locations in the buffer 97 for output. The data output from the buffer 97 is fed through the AND gate 101 to the printing unit 41. The operation of feeding out the first line of data from the buffer 97 continues until the entire line has been output and the counter 77 produces a carry output. This carry output is inverted by the inverter 79 and applied to the D input of the flip-flop 72. The flip-flop 72 is reset by the next clock pulse D gated through the AND gate 73 to terminate the output operation.

It will be noted that during the output operation the $\overline{Q}$ output of the flip-flop 72 is low and inhibits the AND gate 74. This prevent initiation of another output operation while a current output operation is in progress. With one output operation completed, another output operation is initiated in response to the signal W. This prevents initiation of another output operation until storage of the next line in the next memory 68, 69 or 71 is complete.

The output control of the memory 61 is controlled by the detector 88 and the AND gate 74 in combination with the flip-flop 72. It will be noted that the outputs of the decoder 102 are connected to the AND gates 103, 104 and 106 in such a manner that the AND gate 103, 104 and 106 corresponding to the next memory 68, 69 or 71 is enabled. The signal W will be produced when the storage in said next memory 68, 69 or 71 is complete. In more general terms, this means that the detector 88 looks at the next memory from which data is to be read out. If the next memory is full (storage is complete) the signal W will be generated. This means that data may be read out of the memory. The flip-flop 72 controls the AND gate 74 so that even if storage in the next memory is complete, the output operation will not commence until reading out of the data in the previous memory is complete. Thus, the output operation follows the input operation but is prevented from overtaking the input operation. As soon as one line of data has been output and storage of the next line is completed, output of the next line will commence. The significance of the signals MA, MB and MC is that storage of a line of data in the corresponding memory 68, 69 or 71 has been completed but the operation of reading out the line has not yet begun.

In the manner described above, the lines of data are sequentially stored and read out of the memories 68, 69 and 71.

Since the data is fed from the unit 12 into the memories 68, 69 and 71 under control of the input address counter 64 which is incremented by the clock pulses D, it will be understood that the function of the counter 64 corresponds to the function of the counter 46 of the printing unit 41 in the case where the buffer memory 61 is omitted. The output of the flip-flop 62 goes high in response to the sync signal G and goes low in response to overflow of the counter 64. Thus, the flip-flop 62 corresponds to the flip-flop 98 in the case where the buffer memory 61 is omitted. Therefore, where the buffer memory 61 is provided, the signal P is applied to the input of the inverter 42 instead of the signal F. The signal P prevents false sync codes from affecting the operation of the apparatus 11 in the same manner of the signal F. However, it will noted that in the case where the buffer memory 61 is provided, the signal F can not be applied to the inverter 42 as this would produce an inoperative result. Where the buffer 61 is provided, the signal P must be applied to the inverter 42 rather than the signal F.

It is also necessary, since input and output are performed independently, to prevent the input operation from overtaking the output operation. This function is provided by the detector 84. The detector 84 functions in a manner similar to the detector 88. However, the detector 84 is controlled by the count I in the counter 83 rather than the count J in the counter 87. Whereas the detector 88 looks at the next memory for output, the detector 84 looks at the next memory for input. The signal NA, NB or NC is produced when data has been stored in the corresponding memory 68, 69 or 71 and also while data output is in progress. In either case, the memory 68, 69 or 71 in question can not be used for storing another line of data because it is in use. Thus, the signals NA, NB and NC constitute buffer busy signals.

The detector 84 produces the signal Z when the next memory for data input is busy. The signal Z is gated through the OR gate 67 as the signal P and controls the unit 12 to ignore all sync pulses, true or false, until the next memory 68, 69 or 71 is available for storing the next line of data. Thus, sync pulses will be inhibited while data is being transferred from the unit 12 to the memory 61 and also when the memory 61 is full (busy). It will be understood that the detector 88 functions to prevent the output operation from overtaking the input operation whereas the detector 84 functions to prevent the input operation from overtaking the output operation.

Figure 9:
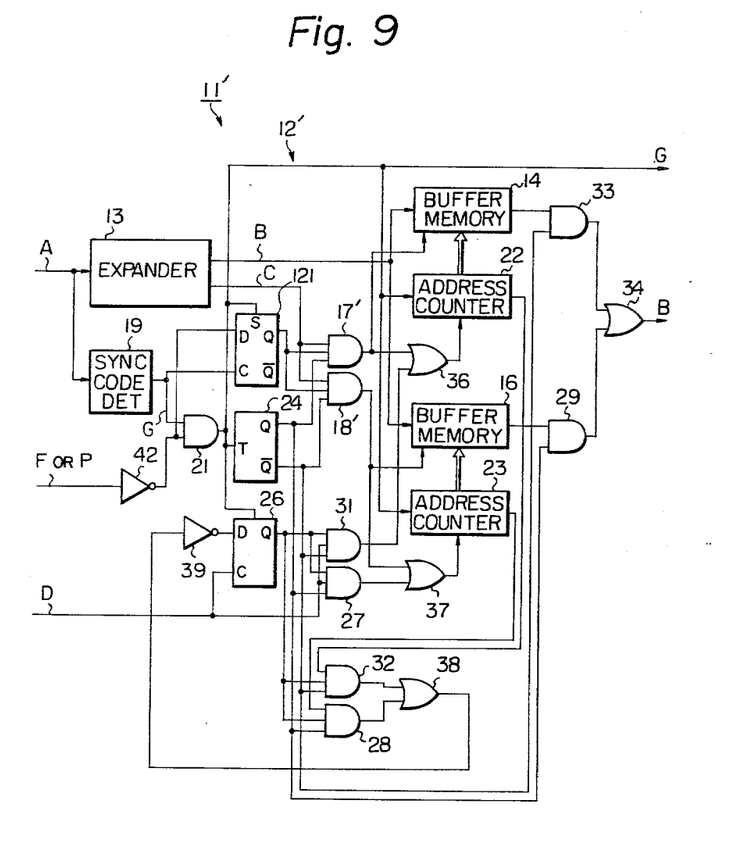
FIG. 9 is a schematic diagram of a modified expander and buffer memory for use with the auxiliary buffer memory.

FIG. 9 illustrates a modified embodiment of the apparatus 11 in which like elements are designated by the same reference numerals and corresponding but modified elements are designated by the same reference numerals primed.

In addition to preventing printing of another line in response to a false sync code, the apparatus 11' is constructed in such a manner that the input operation is disabled in response to a false sync code.

Where the buffer memory 61 is provided, the signal P is applied to the input of the inverter 42. Where the memory 61 is omitted, the signal F is applied to the input of the inverter 42.

The apparatus 11' comprises, in addition to the elements of the apparatus 11, a flip-flop 121. The output of the AND gate 21 is connected to a set input of the flip-flop 121. The output of the sync code detector 19 is connected to a clock input of the flip-flop 121. The output of the inverter 42 is connected to a D input of the flip-flop 121. The Q output of the flip-flop 121 is connected to additional inputs of modified AND gates 17' and 18'.

A false sync pulse G is prevented from passing through the AND gate 21 as in the apparatus 11. However, when the inhibit signal F or P is high, the inverter 42 produces a low output which is applied to the D input of the flip-flop 121.

The flip-flop 121 is set by a true sync pulse G and produces a high Q output to enable the AND gates 17' and 18'. However, a false sync pulse G which occurs while the singal F or P is high and the output of the inverter 42 is low will reset the flip-flop 121. The Q output of the flip-flop 121 will go low and inhibit the AND gates 17' and 18'. This will prevent any further clock pulses C from passing through the AND gates 17' and 18' and will effectively disable the input operation. However, the flip-flop 121 will be set by the next true sync pulse G and the input operation of the next line will proceed in the normal manner.

In summary, it will be seen that the present invention overcomes the drawbacks of the prior art and prevents false sync codes resulting from erroneous alteration of fill bits from adversely affecting the operation of the apparatus. Various modifications will become possible for those skilled in the art after receiving the teachings of the present disclosure without departing from the scope thereof. For example, the number of memories in the auxiliary buffer memory 61 may be two or more than three, rather than three.

What is claimed is:

1. A facsimile reception apparatus including an expander for expanding compressed data in the form of lines, each line of compressed data including data bits followed by fill bits, a sync code following each line of compressed data, and buffer memory means for storing a current line of expanded data and a previous line of expanded data, characterized by comprising:
   sync detector means for detecting the sync code;
   control means for controlling the memory means to simultaneously begin feeding out the previous line of expanded data and storing the current line of expanded data upon detection of the sync code of a previous line of compressed data by the detector means; and
   inhibit means for inhibiting the detector means while the memory means is feeding out the previous line of expanded data.

2. An apparatus as in claim 1, in which each line of compressed data has a first predetermined number of bits and each line of expanded data has a second predetermined number of bits which is larger than the first predetermined number of bits.

3. An apparatus as in claim 1, in which the memory means and control means are constructed in such a manner that a length of time for storing the current line of expanded data is substantially equal to a length of time for feeding out the previous line of expanded data.

4. An apparatus as in claim 1, in which the memory means comprises first and second memories, the control means alternatingly controlling the first and second memories to store lines of expanded data and feed out lines of expanded data.

5. An apparatus as in claim 1, further comprising printing means, the memory means feeding lines of expanded data to the printing means.

6. An apparatus as in claim 5, further comprising auxiliary buffer memory means disposed between the memory means and the printing means, the printing means being constructed to print a line of expanded data fed thereto from the auxiliary memory means faster than a line of expanded data is fed from the memory means to the auxiliary memory means.

7. An apparatus as in claim 6, in which the auxiliary memory means comprises at least two memories which are alternatingly controlled for storing and feeding out lines of expanded data.

8. A facsimile reception apparatus including an expander for expanding compressed data in the form of lines, each line of compressed data including data bits followed by fill bits, a sync code following each line of compressed data, and buffer memory means for storing a current line of expanded data and a previous line of expanded data, characterized by comprising:
   sync detector means for detecting the sync code;
   control means for controlling the memory means to simultaneously begin feeding out the previous line of expanded data and storing the current line of expanded data upon detection of the sync code of a previous line of compressed data by the detector means; and
   inhibit means for inhibiting the detector means while the memory means is feeding out the previous line of expanded data;
   each line of expanded data having a predetermined number of bits, the control means comprising a counter for counting the bits of the previous line of expanded data while the previous line of expanded data is being fed out of the memory means and producing a signal when a count in the counter reaches the predetermined number of bits, the inhibit means beginning inhibition of the detector means in response to the detection of the sync code of the previous line of compressed data by the detector means and terminating inhibition of the detector means in response to the signal from the counter.

9. A facsimile reception apparatus including an expander for expanding compressed data in the form of lines, each line of compressed data including data bits followed by fill bits, a sync code following each line of compressed data, and buffer memory means for storing a current line of expanded data and a previous line of expanded data, characterized by comprising:
   sync detector means for detecting the sync code;
   control means for controlling the memory means to simultaneously begin feeding out the previous line of expanded data and storing the current line of expanded data upon detection of the sync code of a previous line of compressed data by the detector means;
   inhibit means for inhibiting the detector means while the memory means is feeding out the previous line of expanded data;
   printing means, the memory means feeding lines of expanded data to the printing means; and
   auxiliary buffer memory means disposed between the memory means and the printing means, the printing means being constructed to print a line of expanded data fed thereto from the auxiliary memory means faster than a line of expanded data is fed from the memory means to the auxiliary memory means;
   the inhibit means being further constructed to detect a full condition of the auxiliary memory means and inhibit the detector means in response thereto.

10. An apparatus as in claim 9, in which the inhibit means is further constructed to inhibit storing the current line of expanded data in the memory means in response to the full condition of the auxiliary memory means.

* * * * *